(12) United States Patent
Casazza et al.

(10) Patent No.: US 8,669,685 B2
(45) Date of Patent: Mar. 11, 2014

(54) WIND POWER TURBINE FOR PRODUCING ELECTRIC ENERGY

(75) Inventors: Matteo Casazza, Vipiteno (IT); Thomas Kassner, Luxembourg (LU)

(73) Assignee: Wilic S.AR.L., Luxembourg (LU)

( * ) Notice: Subject to any disclaimer, the term of this patent is extended or adjusted under 35 U.S.C. 154(b) by 1153 days.

(21) Appl. No.: 12/618,155

(22) Filed: Nov. 13, 2009

(65) Prior Publication Data

US 2010/0123318 A1    May 20, 2010

(30) Foreign Application Priority Data

Nov. 13, 2008  (IT) .............................. MI2008A2013

(51) Int. Cl.
*F03D 11/00*    (2006.01)

(52) U.S. Cl.
USPC ...................................... 310/216.001; 290/44

(58) Field of Classification Search
USPC .......................................................... 290/55
See application file for complete search history.

(56) References Cited

U.S. PATENT DOCUMENTS

| | | |
|---|---|---|
| 1,894,357 A | 1/1933 | Manikowske et al. |
| 1,948,854 A | 2/1934 | Heath |
| 1,979,813 A | 11/1934 | Reis |
| 2,006,172 A | 6/1935 | Klappauf |
| 2,040,218 A | 5/1936 | Soderberg |
| 2,177,801 A | 10/1939 | Erren |
| 2,469,734 A | 5/1949 | Ledwith |
| 2,496,897 A | 2/1950 | Strickland |
| 2,655,611 A | 10/1953 | Sherman |
| 2,739,253 A | 3/1956 | Plumb |
| 2,806,160 A | 9/1957 | Brainard |
| 2,842,214 A | 7/1958 | Prewitt |
| 2,903,610 A | 9/1959 | Bessiere |
| 3,004,782 A | 10/1961 | Meermans |
| 3,072,813 A | 1/1963 | Reijnst et al. |
| 3,083,311 A | 3/1963 | Krasnow |
| 3,131,942 A | 5/1964 | Ertaud |
| 3,168,686 A | 2/1965 | King et al. |
| 3,221,195 A | 11/1965 | Hoffmann |
| 3,363,910 A | 1/1968 | Toronchuk |
| 3,364,523 A | 1/1968 | Schippers |
| 3,392,910 A | 7/1968 | Tanzberger |

(Continued)

FOREIGN PATENT DOCUMENTS

| | | |
|---|---|---|
| CA | 2404939 | 4/2004 |
| CA | 2518742 | 9/2004 |

(Continued)

OTHER PUBLICATIONS

Maxime R. Dubous, Henk Polinder, Study of TFPM Machines with Toothed Rotor Applied to Direct-Drive Generators for Wind Turbines, 2004.

(Continued)

*Primary Examiner* — Joseph Waks
(74) *Attorney, Agent, or Firm* — Neal, Gerber & Eisenberg LLP (57) ABSTRACT

An electric generator of a wind power turbine has a stator having a cylindrical shell; a number of segments arranged, along the inner face of the cylindrical shell, in a circumferential configuration; and a number of adjustable locking devices located between the segments to press the segments together circumferentially and lock the segments in a given position.

20 Claims, 6 Drawing Sheets

(56) References Cited

U.S. PATENT DOCUMENTS

| | | |
|---|---|---|
| 3,468,548 A | 9/1969 | Webb |
| 3,700,247 A | 10/1972 | Butler et al. |
| 3,708,707 A * | 1/1973 | Kranz .................. 310/433 |
| 3,724,861 A | 4/1973 | Lesiecki |
| 3,746,349 A | 7/1973 | Smale et al. |
| 3,748,089 A | 7/1973 | Boyer et al. |
| 3,789,252 A | 1/1974 | Abegg |
| 3,841,643 A | 10/1974 | McLean |
| 3,860,843 A | 1/1975 | Kawasaki et al. |
| 3,942,026 A | 3/1976 | Carter |
| 3,963,247 A | 6/1976 | Nommensen |
| 3,968,969 A | 7/1976 | Mayer et al. |
| 4,022,479 A | 5/1977 | Orlowski |
| 4,061,926 A | 12/1977 | Peed |
| 4,087,698 A | 5/1978 | Myers |
| 4,273,343 A | 6/1981 | Visser |
| 4,289,970 A | 9/1981 | Deibert |
| 4,291,235 A | 9/1981 | Bergey, Jr. et al. |
| 4,292,532 A | 9/1981 | Leroux |
| 4,336,649 A | 6/1982 | Glaser |
| 4,339,874 A | 7/1982 | Mc'Carty et al. |
| 4,348,604 A | 9/1982 | Thode |
| 4,350,897 A | 9/1982 | Benoit |
| 4,354,126 A | 10/1982 | Yates |
| 4,368,895 A | 1/1983 | Okamoto et al. |
| 4,398,773 A | 8/1983 | Boden et al. |
| 4,452,046 A | 6/1984 | Valentin |
| 4,482,831 A | 11/1984 | Notaras et al. |
| 4,490,093 A | 12/1984 | Chertok et al. |
| 4,517,483 A | 5/1985 | Hucker et al. |
| 4,517,484 A | 5/1985 | Dacier |
| 4,521,026 A | 6/1985 | Eide |
| 4,585,950 A | 4/1986 | Lund |
| 4,613,779 A | 9/1986 | Meyer |
| 4,638,200 A | 1/1987 | Le Corre et al. |
| 4,648,801 A | 3/1987 | Wilson |
| 4,694,654 A | 9/1987 | Kawamura |
| 4,700,096 A | 10/1987 | Epars |
| 4,714,852 A | 12/1987 | Kawada et al. |
| 4,720,640 A | 1/1988 | Anderson et al. |
| 4,722,661 A | 2/1988 | Mizuno |
| 4,724,348 A | 2/1988 | Stokes |
| 4,761,590 A | 8/1988 | Kaszman |
| 4,792,712 A | 12/1988 | Stokes |
| 4,801,244 A | 1/1989 | Stahl |
| 4,866,321 A | 9/1989 | Blanchard et al. |
| 4,900,965 A | 2/1990 | Fisher |
| 4,906,060 A | 3/1990 | Claude |
| 4,973,868 A | 11/1990 | Wust |
| 4,976,587 A | 12/1990 | Johnston et al. |
| 5,004,944 A | 4/1991 | Fisher |
| 5,053,663 A * | 10/1991 | Boer et al. .................. 310/91 |
| 5,063,318 A | 11/1991 | Anderson |
| 5,090,711 A | 2/1992 | Becker |
| 5,091,668 A | 2/1992 | Cuenot et al. |
| 5,177,388 A | 1/1993 | Hotta et al. |
| 5,191,255 A | 3/1993 | Kloosterhouse et al. |
| 5,275,139 A | 1/1994 | Rosenquist |
| 5,280,209 A | 1/1994 | Leupold et al. |
| 5,281,094 A | 1/1994 | McCarty et al. |
| 5,298,827 A | 3/1994 | Sugiyama |
| 5,302,876 A | 4/1994 | Iwamatsu et al. |
| 5,311,092 A | 5/1994 | Fisher |
| 5,315,159 A | 5/1994 | Gribnau |
| 5,331,238 A | 7/1994 | Johnsen |
| 5,410,997 A | 5/1995 | Rosenquist |
| 5,419,683 A | 5/1995 | Peace |
| 5,456,579 A | 10/1995 | Olson |
| 5,483,116 A | 1/1996 | Kusase et al. |
| 5,506,453 A | 4/1996 | McCombs |
| 5,579,800 A | 12/1996 | Walker |
| 5,609,184 A | 3/1997 | Apel et al. |
| 5,663,600 A | 9/1997 | Baek et al. |
| 5,670,838 A | 9/1997 | Everton |
| 5,696,419 A | 12/1997 | Rakestraw et al. |
| 5,704,567 A | 1/1998 | Maglieri |
| 5,746,576 A | 5/1998 | Bayly |
| 5,777,952 A | 7/1998 | Nishimura et al. |
| 5,783,894 A | 7/1998 | Wither |
| 5,793,144 A | 8/1998 | Kusase et al. |
| 5,798,632 A | 8/1998 | Muljadi |
| 5,801,470 A | 9/1998 | Johnson et al. |
| 5,811,908 A | 9/1998 | Iwata et al. |
| 5,814,914 A | 9/1998 | Caamaño |
| 5,844,333 A | 12/1998 | Sheerin |
| 5,844,341 A | 12/1998 | Spooner et al. |
| 5,857,762 A | 1/1999 | Schwaller |
| 5,886,441 A | 3/1999 | Uchida et al. |
| 5,889,346 A | 3/1999 | Uchida et al. |
| 5,894,183 A | 4/1999 | Borchert |
| 5,925,964 A | 7/1999 | Kusase et al. |
| 5,952,755 A | 9/1999 | Lubas |
| 5,961,124 A | 10/1999 | Muller |
| 5,973,435 A | 10/1999 | Irie et al. |
| 5,986,374 A | 11/1999 | Kawakami |
| 5,986,378 A | 11/1999 | Caamaño |
| 6,013,968 A | 1/2000 | Lechner et al. |
| 6,037,692 A | 3/2000 | Miekka et al. |
| 6,064,123 A | 5/2000 | Gislason |
| 6,067,227 A | 5/2000 | Katsui et al. |
| 6,089,536 A | 7/2000 | Watanabe et al. |
| 6,093,984 A | 7/2000 | Shiga et al. |
| 6,127,739 A | 10/2000 | Appa |
| 6,172,429 B1 | 1/2001 | Russell |
| 6,177,746 B1 | 1/2001 | Tupper et al. |
| 6,193,211 B1 | 2/2001 | Watanabe et al. |
| 6,194,799 B1 | 2/2001 | Miekka et al. |
| 6,215,199 B1 | 4/2001 | Lysenko et al. |
| 6,232,673 B1 | 5/2001 | Schoo et al. |
| 6,278,197 B1 | 8/2001 | Appa |
| 6,278,217 B1 * | 8/2001 | Kliman et al. .................. 310/254.1 |
| 6,285,090 B1 | 9/2001 | Brutsaert et al. |
| 6,326,711 B1 | 12/2001 | Yamaguchi et al. |
| 6,365,994 B1 | 4/2002 | Watanabe et al. |
| 6,369,483 B1 * | 4/2002 | Hill .................. 310/429 |
| 6,373,160 B1 | 4/2002 | Schrödl |
| 6,376,956 B1 | 4/2002 | Hosoya |
| 6,378,839 B2 | 4/2002 | Watanabe et al. |
| 6,384,504 B1 | 5/2002 | Elrhart et al. |
| 6,417,578 B1 | 7/2002 | Chapman et al. |
| 6,428,011 B1 | 8/2002 | Oskouei |
| 6,452,287 B1 | 9/2002 | Looker |
| 6,452,301 B1 | 9/2002 | Van Dine et al. |
| 6,455,976 B1 | 9/2002 | Nakano |
| 6,462,457 B2 * | 10/2002 | Shah et al. .................. 310/216.001 |
| 6,472,784 B2 | 10/2002 | Miekka et al. |
| 6,474,653 B1 | 11/2002 | Hintenlang et al. |
| 6,476,513 B1 | 11/2002 | Gueorguiev |
| 6,483,199 B2 | 11/2002 | Umemoto et al. |
| 6,492,743 B1 | 12/2002 | Appa |
| 6,492,754 B1 | 12/2002 | Weiglhofer et al. |
| 6,499,532 B1 | 12/2002 | Williams |
| 6,504,260 B1 | 1/2003 | Debleser |
| 6,515,390 B1 | 2/2003 | Lopatinsky et al. |
| 6,520,737 B1 | 2/2003 | Fischer et al. |
| 6,548,932 B1 | 4/2003 | Weiglhofer et al. |
| 6,590,312 B1 | 7/2003 | Seguchi et al. |
| 6,603,232 B2 | 8/2003 | Van Dine et al. |
| 6,617,747 B1 | 9/2003 | Petersen |
| 6,629,358 B2 | 10/2003 | Setiabudi et al. |
| 6,664,692 B1 | 12/2003 | Kristoffersen |
| 6,676,122 B1 | 1/2004 | Wobben |
| 6,683,397 B2 | 1/2004 | Gauthier et al. |
| 6,700,260 B2 | 3/2004 | Hsu et al. |
| 6,700,288 B2 | 3/2004 | Smith |
| 6,707,224 B1 | 3/2004 | Petersen |
| 6,720,688 B1 | 4/2004 | Schiller |
| 6,727,624 B2 | 4/2004 | Morita et al. |
| 6,746,217 B2 | 6/2004 | Kim et al. |
| 6,759,758 B2 | 7/2004 | Martinez |
| 6,762,525 B1 | 7/2004 | Maslov et al. |
| 6,781,276 B1 | 8/2004 | Stiesdal et al. |
| 6,784,564 B1 | 8/2004 | Wobben |
| 6,794,781 B2 | 9/2004 | Razzell et al. |

(56) References Cited

U.S. PATENT DOCUMENTS

| | | |
|---|---|---|
| 6,828,710 B1 | 12/2004 | Gabrys |
| 6,856,042 B1 | 2/2005 | Kubota |
| 6,879,075 B2 | 4/2005 | Calfo et al. |
| 6,888,262 B2 | 5/2005 | Blakemore |
| 6,891,299 B2 | 5/2005 | Coupart et al. |
| 6,903,466 B1 | 6/2005 | Mercier et al. |
| 6,903,475 B2 | 6/2005 | Ortt et al. |
| 6,906,444 B2 | 6/2005 | Hattori et al. |
| 6,911,741 B2 | 6/2005 | Pettersen et al. |
| 6,921,243 B2 | 7/2005 | Canini et al. |
| 6,931,834 B2 | 8/2005 | Jones |
| 6,933,645 B1 | 8/2005 | Watson |
| 6,933,646 B2 | 8/2005 | Kinoshita |
| 6,942,454 B2 | 9/2005 | Ohlmann |
| 6,945,747 B1 | 9/2005 | Miller |
| 6,949,860 B2 | 9/2005 | Hama et al. |
| 6,951,443 B1 | 10/2005 | Blakemore |
| 6,972,498 B2 | 12/2005 | Jamieson et al. |
| 6,983,529 B2 | 1/2006 | Ortt et al. |
| 6,984,908 B2 | 1/2006 | Rinholm et al. |
| 6,987,342 B2 | 1/2006 | Hans |
| 6,998,729 B1 | 2/2006 | Wobben |
| 7,004,724 B2 | 2/2006 | Pierce et al. |
| 7,008,172 B2 | 3/2006 | Selsam |
| 7,008,348 B2 | 3/2006 | LaBath |
| 7,016,006 B2 | 3/2006 | Song |
| 7,021,905 B2 | 4/2006 | Torrey et al. |
| 7,028,386 B2 | 4/2006 | Kato et al. |
| 7,033,139 B2 | 4/2006 | Wobben |
| 7,038,343 B2 | 5/2006 | Agnes et al. |
| 7,042,109 B2 | 5/2006 | Gabrys |
| 7,057,305 B2 | 6/2006 | Krüger-Gotzmann et al. |
| 7,075,192 B2 | 7/2006 | Bywaters et al. |
| 7,081,696 B2 | 7/2006 | Ritchey |
| 7,088,024 B2 | 8/2006 | Agnes et al. |
| 7,091,642 B2 | 8/2006 | Agnes et al. |
| 7,095,128 B2 | 8/2006 | Canini et al. |
| 7,098,552 B2 | 8/2006 | McCoin |
| 7,109,600 B1 | 9/2006 | Bywaters et al. |
| 7,111,668 B2 | 9/2006 | Rürup |
| 7,116,006 B2 | 10/2006 | McCoin |
| 7,119,469 B2 | 10/2006 | Ortt et al. |
| 7,154,191 B2 | 12/2006 | Jansen et al. |
| 7,161,260 B2 | 1/2007 | Krüger-Gotzmann et al. |
| 7,166,942 B2 | 1/2007 | Yokota |
| 7,168,248 B2 | 1/2007 | Sakamoto et al. |
| 7,168,251 B1 | 1/2007 | Janssen |
| 7,179,056 B2 | 2/2007 | Siegfriedsen |
| 7,180,204 B2 | 2/2007 | Grant et al. |
| 7,183,665 B2 | 2/2007 | Bywaters et al. |
| 7,196,446 B2 | 3/2007 | Hans |
| 7,205,678 B2 | 4/2007 | Casazza et al. |
| 7,217,091 B2 | 5/2007 | LeMieux |
| 7,259,472 B2 | 8/2007 | Miyake et al. |
| 7,281,501 B2 | 10/2007 | Leufen et al. |
| 7,285,890 B2 | 10/2007 | Jones et al. |
| 7,323,792 B2 | 1/2008 | Sohn |
| 7,345,376 B2 | 3/2008 | Costin |
| 7,358,637 B2 | 4/2008 | Tapper |
| 7,377,163 B2 | 5/2008 | Miyagawa |
| 7,385,305 B2 | 6/2008 | Casazza et al. |
| 7,385,306 B2 | 6/2008 | Casazza et al. |
| 7,392,988 B2 | 7/2008 | Moldt et al. |
| 7,427,814 B2 | 9/2008 | Bagepalli et al. |
| 7,431,567 B1 | 10/2008 | Bevington et al. |
| 7,443,066 B2 | 10/2008 | Salamah et al. |
| 7,458,261 B2 | 12/2008 | Miyagawa |
| 7,482,720 B2 | 1/2009 | Gordon et al. |
| 7,548,008 B2 | 6/2009 | Jansen et al. |
| 7,550,863 B2 | 6/2009 | Versteegh |
| 7,687,932 B2 | 3/2010 | Casazza et al. |
| 7,692,357 B2 * | 4/2010 | Qu et al. ............... 310/266 |
| 2002/0047418 A1 | 4/2002 | Seguchi et al. |
| 2002/0047425 A1 | 4/2002 | Coupart et al. |
| 2002/0056822 A1 | 5/2002 | Watanabe et al. |
| 2002/0063485 A1 | 5/2002 | Lee et al. |
| 2002/0070629 A1 * | 6/2002 | Dawson et al. ............... 310/258 |
| 2002/0089251 A1 | 7/2002 | Tajima et al. |
| 2002/0148453 A1 | 10/2002 | Watanabe et al. |
| 2002/0163272 A1 * | 11/2002 | Larsson et al. ............... 310/180 |
| 2003/0011266 A1 | 1/2003 | Morita et al. |
| 2003/0102677 A1 | 6/2003 | Becker et al. |
| 2003/0137149 A1 | 7/2003 | Northrup et al. |
| 2003/0164248 A1 * | 9/2003 | Kulig et al. ........... 174/DIG. 032 |
| 2003/0230899 A1 | 12/2003 | Martinez |
| 2004/0086373 A1 | 5/2004 | Page, Jr. |
| 2004/0094965 A1 | 5/2004 | Kirkegaard et al. |
| 2004/0119292 A1 | 6/2004 | Datta et al. |
| 2004/0150283 A1 | 8/2004 | Calfo et al. |
| 2004/0151575 A1 | 8/2004 | Pierce et al. |
| 2004/0151577 A1 | 8/2004 | Pierce et al. |
| 2004/0189136 A1 | 9/2004 | Kolomeitsev et al. |
| 2005/0002783 A1 | 1/2005 | Hiel et al. |
| 2005/0002787 A1 | 1/2005 | Wobben |
| 2005/0082839 A1 | 4/2005 | McCoin |
| 2005/0082938 A1 * | 4/2005 | Schmidt et al. ............... 310/258 |
| 2005/0230979 A1 | 10/2005 | Bywaters et al. |
| 2005/0280264 A1 | 12/2005 | Nagy |
| 2006/0000269 A1 | 1/2006 | LeMieux et al. |
| 2006/0001269 A1 | 1/2006 | Jansen et al. |
| 2006/0006658 A1 | 1/2006 | McCoin |
| 2006/0012182 A1 | 1/2006 | McCoin |
| 2006/0028025 A1 | 2/2006 | Kikuchi et al. |
| 2006/0066110 A1 | 3/2006 | Jansen et al. |
| 2006/0071575 A1 | 4/2006 | Jansen et al. |
| 2006/0091735 A1 | 5/2006 | Song et al. |
| 2006/0125243 A1 | 6/2006 | Miller |
| 2006/0131985 A1 | 6/2006 | Qu et al. |
| 2006/0152012 A1 | 7/2006 | Wiegel et al. |
| 2006/0152015 A1 | 7/2006 | Bywaters et al. |
| 2006/0152016 A1 | 7/2006 | Bywaters et al. |
| 2007/0020109 A1 | 1/2007 | Takahashi et al. |
| 2007/0116567 A1 | 5/2007 | Luetze |
| 2007/0187954 A1 | 8/2007 | Struve et al. |
| 2007/0187956 A1 | 8/2007 | Wobben |
| 2007/0222223 A1 | 9/2007 | Bagepalli et al. |
| 2007/0222226 A1 | 9/2007 | Casazza et al. |
| 2007/0222227 A1 | 9/2007 | Casazza et al. |
| 2008/0003105 A1 | 1/2008 | Nies |
| 2008/0025847 A1 | 1/2008 | Teipen |
| 2008/0050234 A1 | 2/2008 | Ingersoll et al. |
| 2008/0107526 A1 | 5/2008 | Wobben |
| 2008/0118342 A1 | 5/2008 | Seidel et al. |
| 2008/0197636 A1 | 8/2008 | Tilscher et al. |
| 2008/0197638 A1 | 8/2008 | Wobben |
| 2008/0246224 A1 | 10/2008 | Pabst et al. |
| 2008/0290664 A1 | 11/2008 | Kruger |
| 2008/0303281 A1 | 12/2008 | Krueger |
| 2008/0309189 A1 | 12/2008 | Pabst et al. |
| 2008/0315594 A1 | 12/2008 | Casazza et al. |
| 2009/0045628 A1 | 2/2009 | Erdman et al. |
| 2009/0060748 A1 | 3/2009 | Landa et al. |
| 2009/0094981 A1 | 4/2009 | Eggleston |
| 2009/0096309 A1 | 4/2009 | Pabst et al. |
| 2009/0302702 A1 | 12/2009 | Pabst et al. |
| 2010/0019502 A1 | 1/2010 | Pabst et al. |
| 2010/0026010 A1 | 2/2010 | Pabst |
| 2010/0117362 A1 | 5/2010 | Vihriala et al. |

FOREIGN PATENT DOCUMENTS

| | | |
|---|---|---|
| CN | 1554867 | 12/2004 |
| DE | 1130913 B | 6/1962 |
| DE | 2164135 A1 | 7/1973 |
| DE | 2322458 A1 | 11/1974 |
| DE | 2506160 A1 | 8/1976 |
| DE | 2922885 A1 | 12/1980 |
| DE | 3638129 | 5/1988 |
| DE | 3718954 | 12/1988 |
| DE | 3844505 | 7/1990 |
| DE | 3903399 | 8/1990 |
| DE | 4304577 | 8/1994 |
| DE | 4402184 | 8/1995 |
| DE | 4415570 | 11/1995 |

(56) References Cited

FOREIGN PATENT DOCUMENTS

| | | |
|---|---|---|
| DE | 4444757 | 6/1996 |
| DE | 19636591 | 3/1998 |
| DE | 19644355 | 4/1998 |
| DE | 19652673 | 6/1998 |
| DE | 19711869 | 9/1998 |
| DE | 19748716 | 11/1998 |
| DE | 29819391 U1 | 2/1999 |
| DE | 19801803 | 4/1999 |
| DE | 19932394 | 1/2001 |
| DE | 19947915 | 4/2001 |
| DE | 19951594 | 5/2001 |
| DE | 20102029 U1 | 6/2001 |
| DE | 10000370 | 7/2001 |
| DE | 10219190 | 11/2003 |
| DE | 10246690 | 4/2004 |
| DE | 102004018524 A1 | 11/2005 |
| DE | 102004028746 | 12/2005 |
| EP | 0013157 | 7/1980 |
| EP | 0232963 | 8/1987 |
| EP | 0313392 | 4/1989 |
| EP | 0627805 | 12/1994 |
| EP | 1108888 | 6/2001 |
| EP | 1167754 | 1/2002 |
| EP | 1289097 | 3/2003 |
| EP | 1291521 | 3/2003 |
| EP | 1309067 | 5/2003 |
| EP | 1363019 | 11/2003 |
| EP | 1375913 | 1/2004 |
| EP | 1394406 | 3/2004 |
| EP | 1394451 | 3/2004 |
| EP | 1589222 | 10/2005 |
| EP | 1612415 | 1/2006 |
| EP | 1641102 | 3/2006 |
| EP | 1677002 | 7/2006 |
| EP | 1772624 | 4/2007 |
| EP | 1780409 | 5/2007 |
| EP | 1829762 | 9/2007 |
| EP | 1921311 | 5/2008 |
| EP | 2060786 | 5/2009 |
| ES | 2140301 | 2/2000 |
| FR | 2401091 A1 | 3/1979 |
| FR | 2445053 A1 | 7/1980 |
| FR | 2594272 | 8/1987 |
| FR | 2760492 | 9/1998 |
| FR | 2796671 | 1/2001 |
| FR | 2798168 | 3/2001 |
| FR | 2810374 | 12/2001 |
| FR | 2882404 | 8/2006 |
| GB | 191317268 | 3/1914 |
| GB | 859176 | 1/1961 |
| GB | 1524477 | 9/1978 |
| GB | 1537729 | 1/1979 |
| GB | 2041111 | 9/1980 |
| GB | 2050525 | 1/1981 |
| GB | 2075274 | 11/1981 |
| GB | 2131630 | 6/1984 |
| GB | 2 144 587 | 3/1985 |
| GB | 2208243 | 3/1989 |
| GB | 2266937 | 11/1993 |
| GB | 2372783 | 9/2002 |
| JP | 57059462 | 4/1982 |
| JP | 3145945 | 6/1991 |
| JP | 5122912 | 5/1993 |
| JP | 6002970 | 1/1994 |
| JP | 6269141 | 9/1994 |
| JP | 10-070858 | 3/1998 |
| JP | 11236977 | 8/1999 |
| JP | 11-299197 | 10/1999 |
| JP | 2000-134885 | 5/2000 |
| JP | 2001-057750 | 2/2001 |
| JP | 2003453072 | 7/2003 |
| JP | 2004-153913 | 5/2004 |
| JP | 2004-297947 | 10/2004 |
| JP | 2005-006375 | 1/2005 |
| JP | 2005-020906 | 1/2005 |
| JP | 2005-312150 | 11/2005 |
| NL | 8902534 | 5/1991 |
| RU | 2000466 | 9/1993 |
| RU | 2229621 | 5/2004 |
| WO | WO8402382 | 6/1984 |
| WO | WO9105953 | 5/1991 |
| WO | WO9212343 | 7/1992 |
| WO | WO9730504 | 8/1997 |
| WO | WO9733357 | 9/1997 |
| WO | WO9840627 | 9/1998 |
| WO | WO9930031 | 6/1999 |
| WO | WO9933165 | 7/1999 |
| WO | WO9937912 | 7/1999 |
| WO | WO9939426 | 8/1999 |
| WO | WO0001056 | 1/2000 |
| WO | WO0106121 | 1/2001 |
| WO | WO0106623 | 1/2001 |
| WO | WO0107784 | 2/2001 |
| WO | WO0121956 | 3/2001 |
| WO | WO0125631 | 4/2001 |
| WO | WO0129413 | 4/2001 |
| WO | WO0134973 | 5/2001 |
| WO | WO0135517 | 5/2001 |
| WO | WO0169754 | 9/2001 |
| WO | WO0233254 | 4/2002 |
| WO | WO02057624 | 7/2002 |
| WO | WO02083523 | 10/2002 |
| WO | WO03036084 | 5/2003 |
| WO | WO03067081 | 8/2003 |
| WO | WO03076801 | 9/2003 |
| WO | WO2004017497 | 2/2004 |
| WO | WO2005103489 | 11/2005 |
| WO | WO2006013722 | 2/2006 |
| WO | WO2006032515 | 3/2006 |
| WO | WO2007063370 | 6/2007 |
| WO | WO2007110718 | 10/2007 |
| WO | WO2008052562 | 5/2008 |
| WO | WO2008078342 | 7/2008 |
| WO | WO2008086608 | 7/2008 |
| WO | WO2008098573 | 8/2008 |
| WO | WO2008102184 | 8/2008 |
| WO | WO2008116463 | 10/2008 |
| WO | WO2008131766 | 11/2008 |

OTHER PUBLICATIONS

Variable Speed Gearless Wind Turbine (website), http://www.mhi.cojp/msmw/mw/en/gearless.html, viewed on Sep. 22, 2006.
Italian Search Report dated Nov. 10, 2009.
European Search Report from corresponding foreign application dated Jan. 4, 2010.

* cited by examiner

WIND POWER TURBINE FOR PRODUCING ELECTRIC ENERGY

PRIORITY CLAIM

This application claims the benefit of and priority to Italian Patent Application No. MI2008A 002013, filed on Nov. 13, 2008, the entire contents of which are incorporated herein.

BACKGROUND

Wind power turbines with releasable locking devices are known. For example, one known releasable locking device extends through holes in the cylindrical shell of the wind power turbine. However, this known releasable locking device is unsatisfactory, on account of the cylindrical shell being exposed to weather, the necessity of ensuring perfect sealing of all the holes, and the danger to which workers are exposed by having to work on the outside of the shell.

SUMMARY AND TECHNICAL FIELD

The present disclosure relates to a wind power turbine for producing electric energy and more specifically a wind power turbine designed to eliminate the drawbacks of the known art.

In one embodiment, the present disclosure provides a wind power turbine designed to permit precise, reliable, releasable locking and easy removal of the segments.

More specifically, one embodiment of the present disclosure relates to a wind power turbine comprising a nacelle; an electric generator fitted to the nacelle; and a blade assembly fitted to the nacelle to rotate about an axis of rotation. The electric generator comprises a stator, in turn comprising a cylindrical shell extending about the axis of rotation; a number of segments parallel to the axis of rotation and equally spaced about the axis of rotation, along the inner face of the cylindrical shell, in a circumferential configuration.

In one embodiment, each segment is defined by a pack of laminations crosswise to the axis of rotation, and has cavities parallel to the axis of rotation and along which an electric winding extends.

The segment fastener must ensure safe, accurate locking of the segments, must be releasable to permit replacement of the segments, and must be easily removable, in the sense that removal of one of the stator segments involves removing a minimum number of other component parts of the wind power turbine.

According to one embodiment of the present disclosure, there is provided a wind power turbine for producing electric energy, the wind power turbine comprising a nacelle; an electric generator fitted to the nacelle; and a blade assembly fitted to the nacelle to rotate about a rotation axis; wherein the electric generator comprises a stator including a cylindrical shell extending about the rotation axis; a number of segments arranged about the rotation axis, along an inner face of the cylindrical shell, in a circumferential configuration; and at least one adjustable locking device located between two segments so as to press the segments circumferentially together and lock the segments in a designated position.

The segments are thus locked in respective positions by the force produced by the adjustable locking devices and exchanged between adjacent segments.

Additional features and advantages are described in, and will be apparent from, the following Detailed Description and the figures.

BRIEF DESCRIPTION OF THE DRAWINGS

A number of non-limiting embodiments of the present invention will be described by way of example with reference to the accompanying drawings, in which.

DETAILED DESCRIPTION

Figure 1:
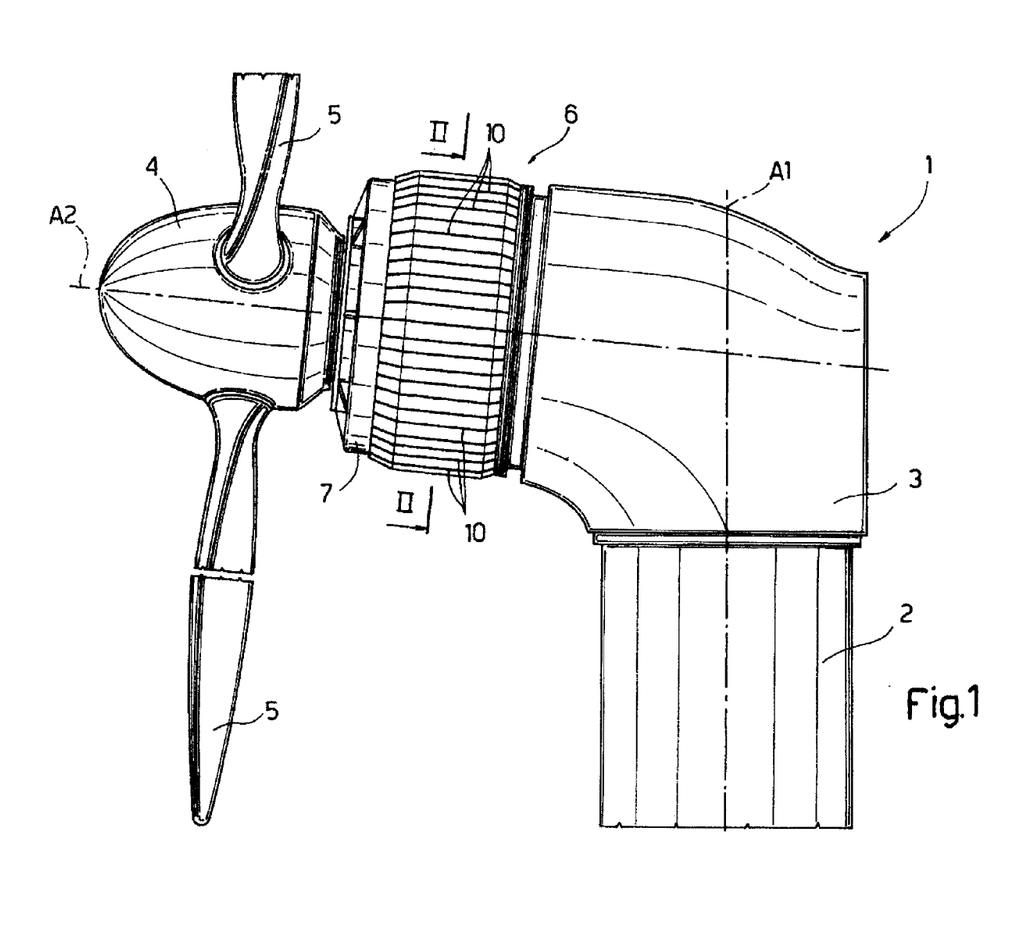
FIG. 1 shows a partly sectioned perspective side view, with parts removed for clarity, of a wind power turbine in accordance with one embodiment of the present disclosure.

Referring now to the example embodiments of the present disclosure illustrated in FIGS. 1 to 11, number 1 in FIG. 1 indicates as a whole a wind power turbine for producing electric energy. Wind power turbine 1 comprises a pylon 2 extending along a vertical axis A1; a nacelle 3 fitted to the top end of pylon 2 and rotating with respect to pylon 2 about axis A1; a hub 4 mounted to rotate with respect to nacelle 3 about a rotation axis A2 crosswise to axis A1; and three blades 5, only two of which are shown in FIG. 1. Hub 4 and the three blades 5 define a blade assembly that rotates with respect to nacelle 3 about rotation axis A2.

Pylon 2 is substantially defined by a hollow cylinder housing stairs and/or elevators not shown in the drawings.

Nacelle 3 comprises a hollow body fitted to the top end of pylon 2 to rotate about axis A1, and supports an electric generator 6 comprising a cylindrical shell 7 fixed to nacelle 3.

Figure 2:
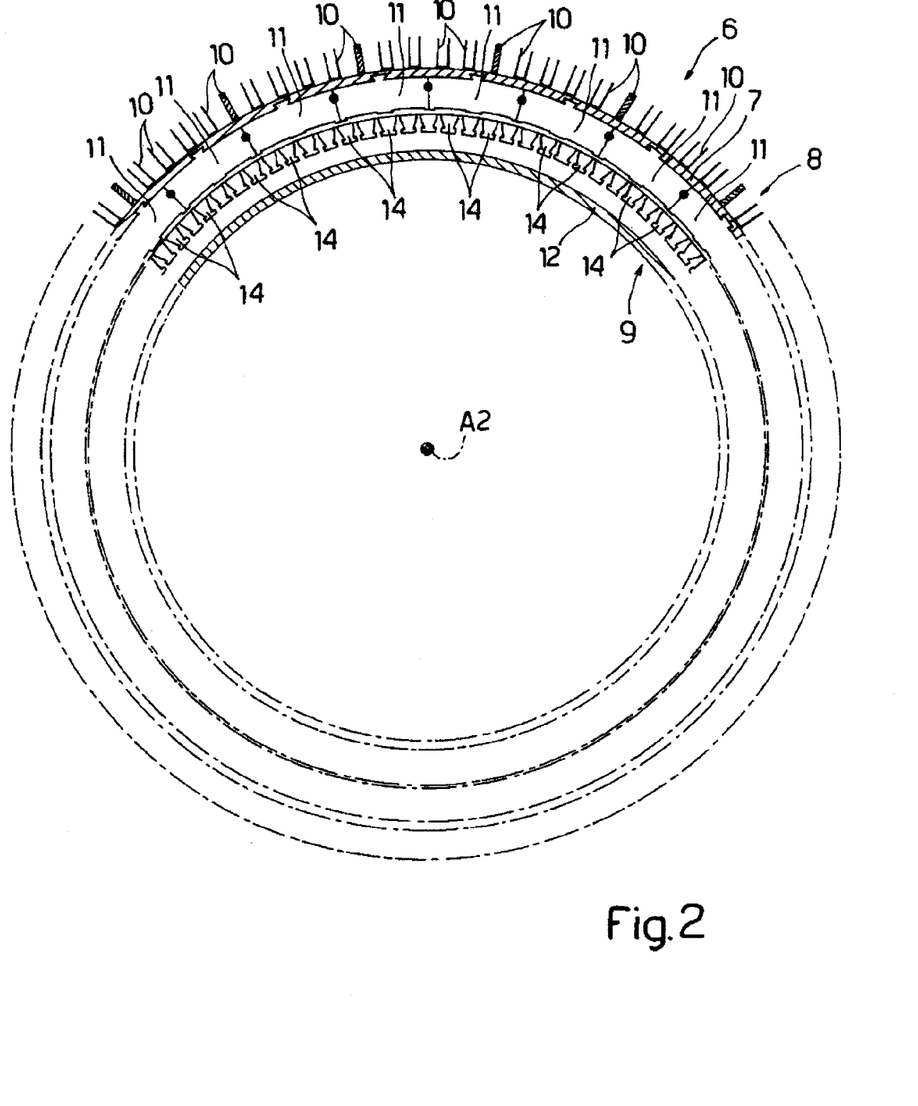
FIG. 2 shows a larger-scale front section, with parts removed for clarity, of one embodiment of the wind power turbine taken substantially along line II-II.

With reference to FIG. 2, electric generator 6 comprises a stator 8; and a hollow rotor 9 rotating about rotation axis A2. Stator 8 comprises cylindrical shell 7; a number of cooling fins 10 parallel to rotation axis A2 and fixed along the outer surface of cylindrical shell 7; and a number of segments 11 equally spaced about rotation axis A2 and fixed along the inner surface of cylindrical shell 7.

Each segment 11 extends predominantly parallel to rotation axis A2, and comprises a pack of laminations (not shown) in which cavities are formed parallel to rotation axis A2; and electric windings (not shown) housed predominantly in said cavities (not shown).

Segments 11 are arranged side by side circumferentially against the inner face of cylindrical shell 7.

Rotor 9 comprises a cylindrical shell 12 (FIG. 3); and a number of permanent magnets 14 equally spaced about rotation axis A2 and locked in place along the outer surface of cylindrical shell 12. Each permanent magnet 14 extends predominantly axially, (i.e., parallel to rotation axis A2).

Figure 3:
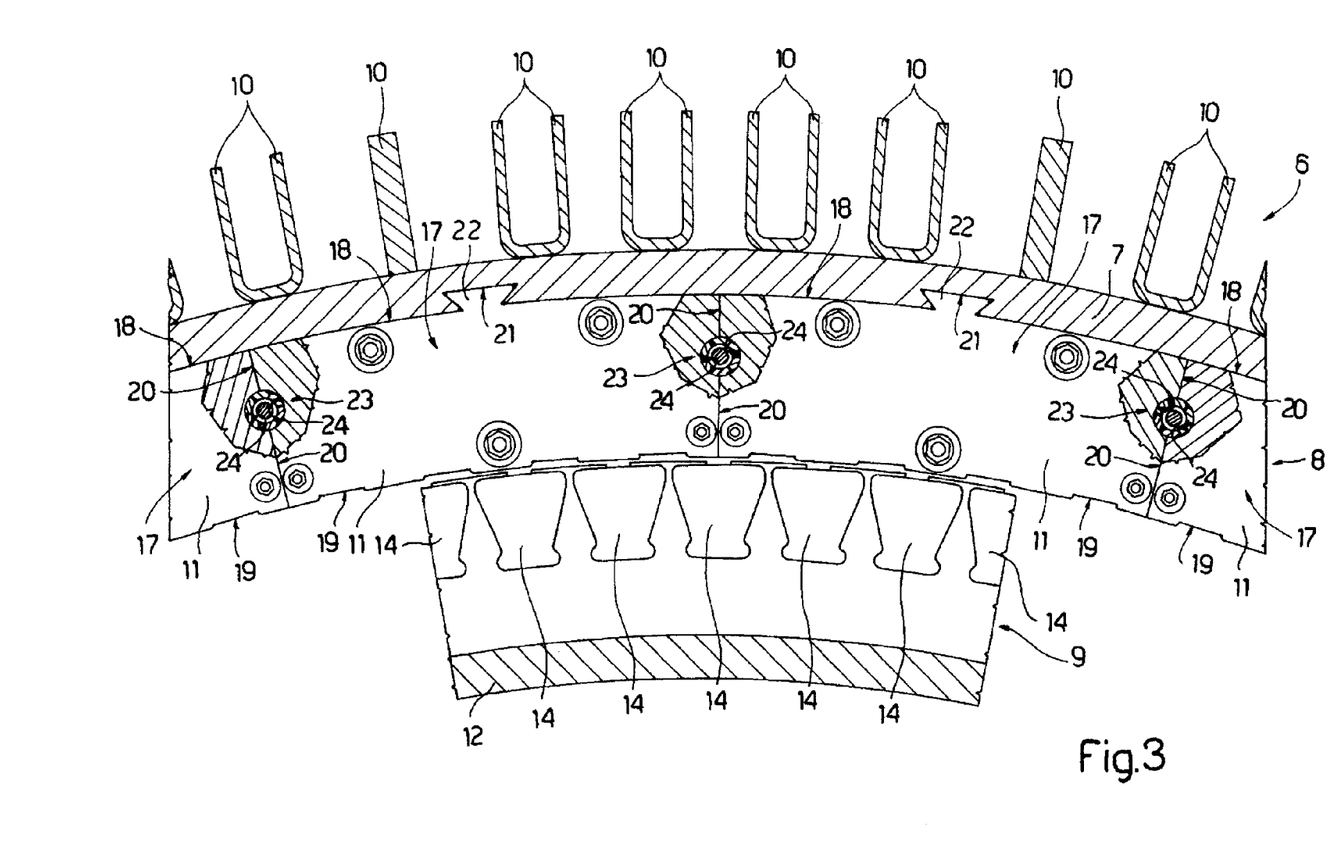
FIG. 3 shows a larger-scale, partly sectioned isometric view, with parts removed for clarity, of a detail of the wind power turbine illustrated in FIG. 2.

With reference to FIG. 3, each segment 11 is parallelepiped-shaped, and has two opposite end faces 17 (only one shown in FIG. 3); an outer face 18 facing cylindrical shell 7; an inner face 19 opposite outer face 18 and facing rotor 9; and two flanks 20, each facing a flank 20 of an adjacent segment 11.

Cylindrical shell 7 has a number of axial grooves 21 formed along the inner face of cylindrical shell 7 and equally spaced about rotation axis A2.

Each segment 11 has an axial rib 22 extending along outer face 18 and which slides axially into groove 21. In the illustrated embodiment, both groove 21 and rib 22 have a dovetail-shaped cross section.

Stator 8 also comprises a number of adjustable locking devices 23, each located between two adjacent segments 11 to press segments 11 together circumferentially and lock segments 11 in a given or designated position.

Accordingly, an axial seat 24 is formed along each flank 20 of the segments to partly house an adjustable locking device 23.

Figure 4:
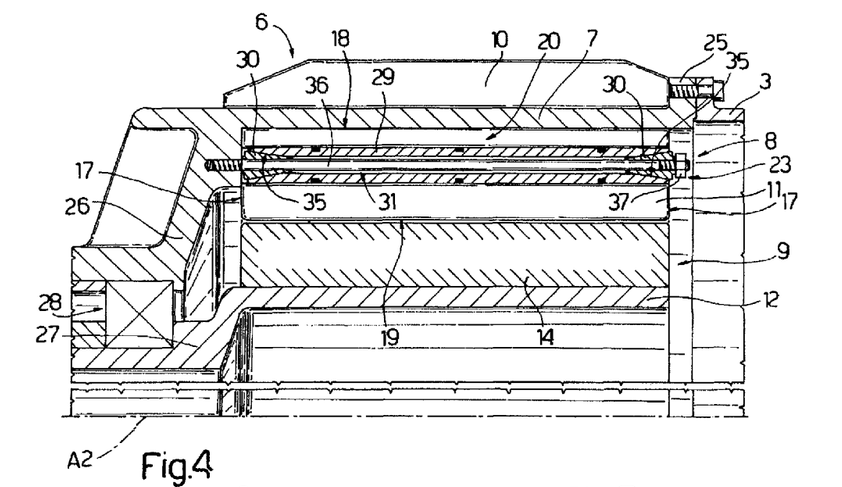
FIGS. 4, 5 and 6 show larger-scale longitudinal sections, with parts removed for clarity, of one embodiment of the wind power turbine disclosed herein.
Figure 5:
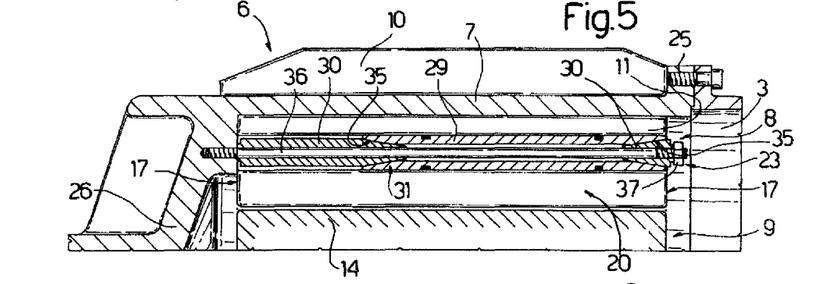
Figure 6:
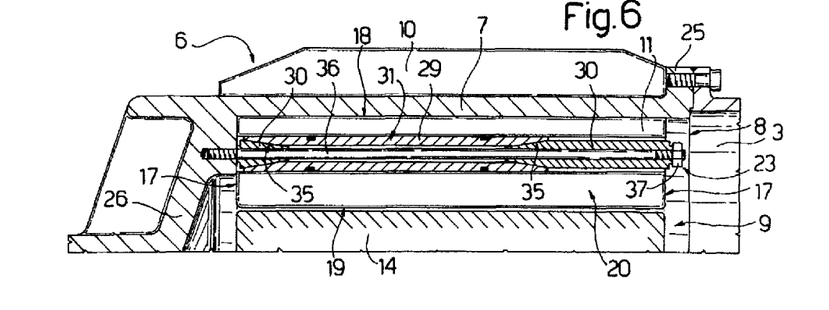

Each adjustable locking device 23 is substantially cylindrical and, in use, extends axially, as shown more clearly in the three FIG. 4, 5, 6 variations.

FIGS. 4 to 6 show longitudinal sections of stator 8 and rotor 9. More specifically, cylindrical shell 7 comprises, at one end, a flange 25 for connecting electric generator 6 to nacelle 3, and, at the opposite end, a collar 26. With reference to FIG. 4, cylindrical shell 12 comprises a collar 27 fixed to hub 4 (not shown in FIGS. 4 to 6) and connected in rotary manner to collar 26 by a bearing 28.

Each adjustable locking device 23 comprises an expandable sleeve 29; two wedge-shaped members 30; and an adjusting mechanism 31 for adjusting the position of wedge-shaped members 30 with respect to expandable sleeve 29 and, in use, with respect to segments 11.

Figures 7, 8, 9:
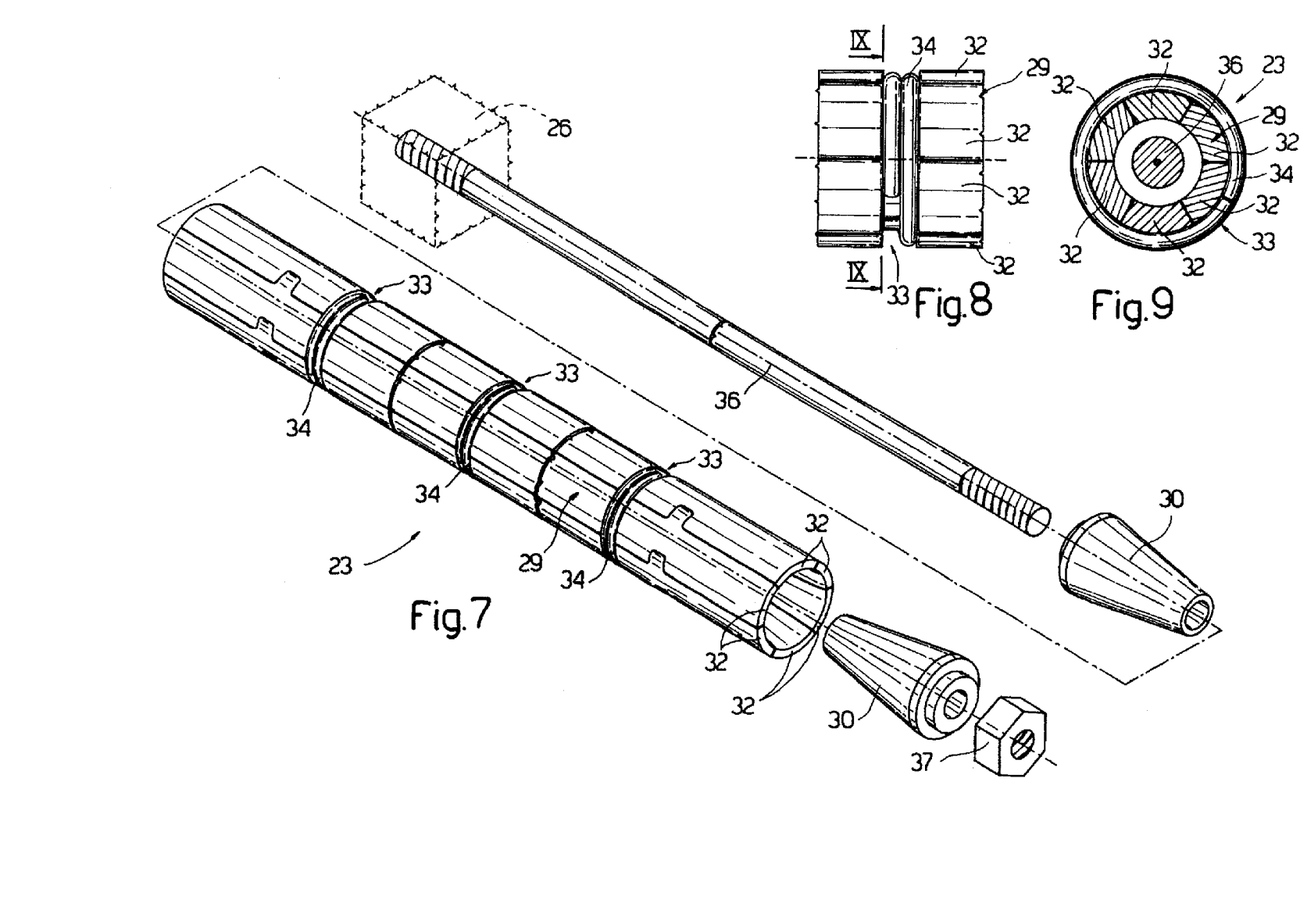
FIG. 7 shows an exploded isometric view, with parts removed for clarity, of an adjustable locking device of the wind power turbine illustrated in FIG. 1.
FIG. 8 shows a larger-scale side view, with parts removed for clarity, of a detail of the adjustable locking device illustrated in FIG. 7.
FIG. 9 shows a larger-scale front section, with parts removed for clarity, of the adjustable locking device of FIG. 8 taken substantially along line IX-IX.

With reference to FIG. 7, each sleeve 29 comprises a number of elastically connected axial sectors 32. More specifically, axial sectors 32 comprise a number of annular grooves 33, and expandable sleeve 29 comprises a number of springs 34 housed inside grooves 33, as shown more clearly in FIGS. 8 and 9, to hold axial sectors 32 together.

As shown in FIGS. 4 to 6, each expandable sleeve 29 has a central portion thicker than the end portions. This difference in thickness is caused by reducing the diameter of the inner opening of expandable sleeve 29; and the central portion and end portions are connected by converging conical faces 35.

With reference to FIG. 7, each wedge-shaped member 30 is in the form of a sleeve having a conical end portion with substantially the same taper as surfaces 35 (FIGS. 4, 5, 6).

Adjusting mechanism 31 comprises a tie 36 with two threaded ends; and a nut 37.

With reference to FIGS. 4 to 6, expandable sleeve 29 is located between two segments 11; tie 36 is screwed to collar 26 and extends predominantly inside expandable sleeve 29; the two wedge-shaped members 30 are fitted, with their respective tapers converging, inside expandable sleeve 29 and about tie 36; and, when nut 37 is screwed to the free threaded end of tie 36, wedge-shaped members 30 are pushed towards each other and expand expandable sleeve 29 in opposition to springs 34.

The location of faces 35 determines the axial point at which the expansion forces transmitted by adjustable locking device 23 to segments 11 are concentrated. Some possible variations of locking device 23 are shown in FIGS. 4 to 6. It should be appreciated that the various types of locking devices 23 shown in FIGS. 4 to 6 are arranged in orderly sequence, so the circumferential force application points are distributed axially as evenly as possible.

Figure 10:
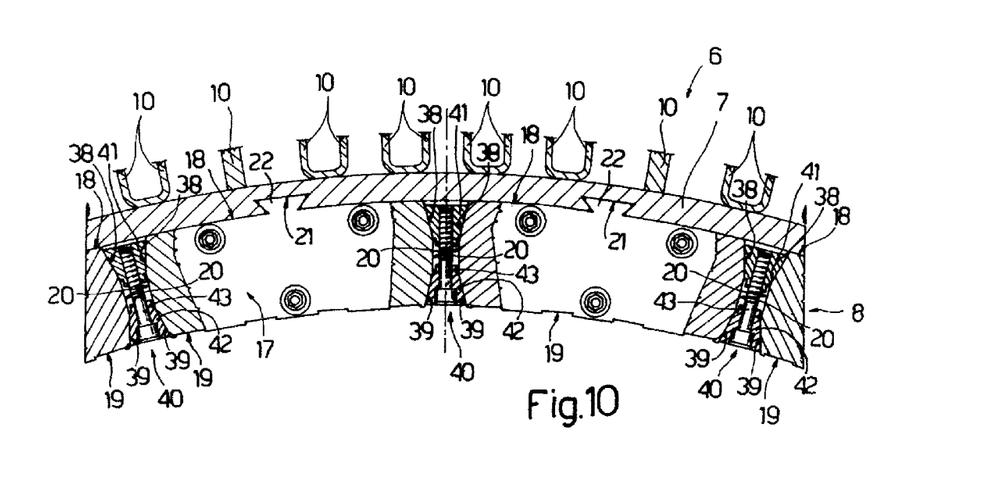
FIG. 10 shows a larger-scale front section, with parts removed for clarity, of a wind power turbine in accordance with another embodiment of the present disclosure.

In the FIG. 10 embodiment, two converging inclined faces 38 and 39 are formed along each flank 20 of each segment 11; and generator 6 comprises a number of adjustable locking devices 40, each interposed between two adjacent segments to exert circumferential force.

Figure 11:
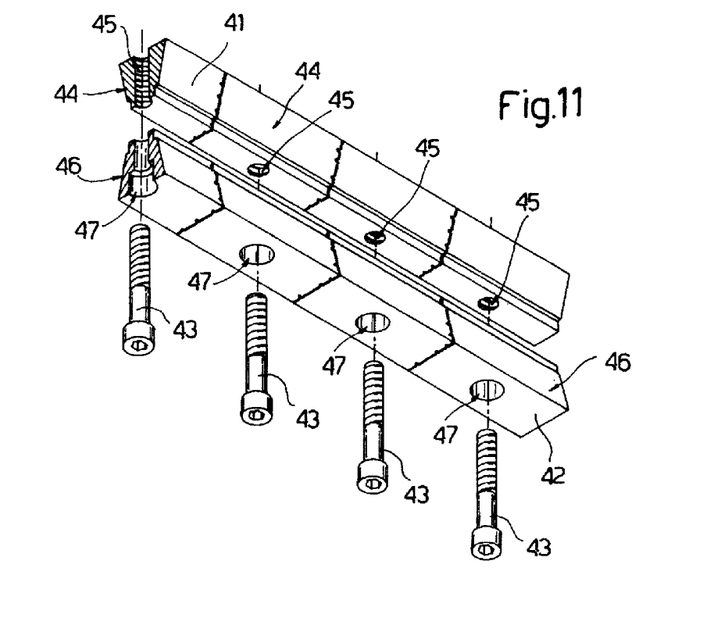
FIG. 11 shows a partly sectioned, exploded isometric view, with parts removed for clarity, of an adjustable locking device in accordance with the illustrated embodiment of FIG. 10.

Each adjustable locking device 40 comprises two wedge-shaped members 41 and 42; and a number of bolts 43 for connecting the two wedge-shaped members 41, 42 facing each other.

Wedge-shaped member 41 has a substantially isosceles-trapezium-shaped cross section; two converging opposite faces 44; and a number of threaded holes 45 between faces 44.

Similarly, wedge-shaped member 42 has a substantially isosceles-trapezium-shaped cross section; two converging opposite faces 46; and a number of threaded holes 47 between faces 46.

In actual use, wedge-shaped member 41 extends parallel to rotation axis A2, with faces 44 contacting respective faces 38 of two adjacent segments 11, and wedge-shaped member 42 extends parallel to rotation axis A2, with faces 46 contacting respective faces 39 of two adjacent segments 11; and tightening bolts 43 brings the two wedge-shaped members 41, 42 closer together to transmit circumferential force along segments 11.

In the FIGS. 10 and 11 variation, the adjusting mechanism is substantially defined by bolts 43 engaging respective holes 45.

In a variation not shown, for example, the wind power turbine only comprises one adjustable locking device between two adjacent segments, and the other adjustable locking devices are replaced by spacers.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A wind power turbine configured to produce electric energy, the wind power turbine comprising:
   a nacelle;
   an electric generator fitted to the nacelle, the electric generator including:
      a stator including a cylindrical shell extending about a rotation axis,
      a plurality of segments arranged about the rotation axis along an inner face of the cylindrical shell in a circumferential configuration, and
      at least one adjustable locking device located about the rotation axis between two of the segments and configured to press the two segments circumferentially together and lock the two segments in a designated position; and
   a blade assembly fitted to the nacelle and configured to rotate about the rotation axis.

2. The wind power turbine of claim 1, wherein the adjustable locking device includes at least one wedge-shaped member, and an adjusting mechanism configured to adjust the position of the wedge-shaped member with respect to the two segments.

3. The wind power turbine of claim 2, wherein the adjustable locking device includes an expandable sleeve, said at least one wedge-shaped member and said adjusting mechanism configured to extend inside the expandable sleeve, the adjusting mechanism configured to adjust the position of the at least one wedge-shaped member with respect to the expandable sleeve to selectively expand the expandable sleeve.

4. The wind power turbine of claim 3, wherein said at least one wedge-shaped member is a sleeve having a conical end portion and said expandable sleeve has a conical inner surface configured to slide along the conical end portion of the at least one wedge-shaped member.

5. The wind power turbine of claim 4, wherein the expandable sleeve includes a plurality of elastically connected axial sectors.

6. The wind power turbine of claim 1, wherein each of the segments has two flanks and two seats, each flank facing the flank of an adjacent one of the segments and each seat extending along a respective one of the flanks to partly house one of the adjustable locking devices.

7. The wind power turbine of claim 1, wherein the adjustable locking device includes at least two wedge-shaped members and at least one adjusting mechanism configured to adjust the position of the at least two wedge-shaped members with respect to the segments.

8. The wind power turbine of claim 7, wherein each wedge-shaped member has two opposite converging faces, each of the segments has two flanks and, along each of the flanks, two converging inclined faces are configured to slide in contact with the respective faces of the two opposed wedge-shaped members.

9. The wind power turbine of claim 1, wherein each of the segments has an outer face facing the cylindrical shell, a first connector is located along the outer face, and the cylindrical shell has a second connector along the inner face, at least one of the first connector and the second connector are configured to slide in an axial direction parallel to the rotation axis to connect the first connector and the second connector.

10. The wind power turbine of claim 9, wherein the first connector includes an axial rib having a dovetail-shaped cross section and the second connector includes a number of axial grooves, each axial groove having a dovetail-shaped cross section and configured to house the axial rib.

11. A wind power turbine electric generator comprising:
a stator including a cylindrical shell extending about a rotation axis,
a plurality of segments arranged about the rotation axis along an inner face of the cylindrical shell in a circumferential configuration, and
at least one adjustable locking device located about the rotation axis between two of the segments and configured to press the two segments circumferentially together and lock the two segments in a designated position.

12. The wind power turbine electric generator of claim 11, wherein the adjustable locking device includes at least one wedge-shaped member, and an adjusting mechanism configured to adjust the position of the wedge-shaped member with respect to the two segments.

13. The wind power turbine electric generator of claim 12, wherein the adjustable locking device includes an expandable sleeve, said at least one wedge-shaped member and said adjusting mechanism configured to extend inside the expandable sleeve, the adjusting mechanism configured to adjust the position of the at least one wedge-shaped member with respect to the expandable sleeve to selectively expand the expandable sleeve.

14. The wind power turbine electric generator of claim 13, wherein said at least one wedge-shaped member is a sleeve having a conical end portion and said expandable sleeve has a conical inner surface configured to slide along the conical end portion of the at least one wedge-shaped member.

15. The wind power turbine electric generator of claim 14, wherein the expandable sleeve includes a plurality of elastically connected axial sectors.

16. The wind power turbine electric generator of claim 11, wherein each of the segments has two flanks and two seats, each flank facing the flank of an adjacent one of the segments and each seat extending along a respective one of the flanks to partly house one of the adjustable locking devices.

17. The wind power turbine electric generator of claim 11, wherein the adjustable locking device includes at least two wedge-shaped members and at least one adjusting mechanism configured to adjust the position of the at least two wedge-shaped members with respect to the segments.

18. The wind power turbine electric generator of claim 17, wherein each wedge-shaped member has two opposite converging faces, each of the segments has two flanks and, along each of the flanks, two converging inclined faces are configured to slide in contact with the respective faces of the two opposed wedge-shaped members.

19. The wind power turbine electric generator of claim 11, wherein each of the segments has an outer face facing the cylindrical shell, a first connector is located along the outer face, and the cylindrical shell has a second connector along the inner face, at least one of the first connector and the second connector are configured to slide in an axial direction parallel to the rotation axis to connect the first connector and the second connector.

20. The wind power turbine electric generator of claim 19, wherein the first connector includes an axial rib having a dovetail-shaped cross section and the second connector includes a number of axial grooves, each axial groove having a dovetail-shaped cross section and configured to house the axial rib.

* * * * *